US011719959B2

(12) United States Patent
Arieli et al.

(10) Patent No.: US 11,719,959 B2
(45) Date of Patent: *Aug. 8, 2023

(54) OPTICAL ELEMENT FOR CONVERTING A SINGLE-VISION LENS TO A PROGRESSIVE LENS

(71) Applicant: Addon Optics Ltd., Maale Adumim (IL)

(72) Inventors: Yoel Arieli, Jerusalem (IL); Haim Engler, Maale Adumim (IL); Amir Erlichman, Herzelia (IL)

(73) Assignee: Addon Optics Ltd., Maale Adumim (IL)

( * ) Notice: Subject to any disclaimer, the term of this patent is extended or adjusted under 35 U.S.C. 154(b) by 451 days.

This patent is subject to a terminal disclaimer.

(21) Appl. No.: 16/898,954

(22) Filed: Jun. 11, 2020

(65) Prior Publication Data

US 2020/0301171 A1 Sep. 24, 2020

Related U.S. Application Data

(63) Continuation of application No. 15/976,669, filed on May 10, 2018, now Pat. No. 10,712,591, which is a (Continued)

(51) Int. Cl.
*G02C 7/08* (2006.01)
*G02C 7/06* (2006.01)
(Continued)

(52) U.S. Cl.
CPC ............... *G02C 7/086* (2013.01); *G02B 1/14* (2015.01); *G02B 3/10* (2013.01); *G02B 7/025* (2013.01);
(Continued)

(58) Field of Classification Search
CPC ........ G02C 7/086; G02C 7/021; G02C 7/061; G02C 7/10; G02C 9/00; G02C 2202/16; G02B 1/14; G02B 3/10; G02B 7/025
(Continued)

(56) References Cited

U.S. PATENT DOCUMENTS

| 2,511,329 A | 6/1950 | Edward |
| 2,759,394 A | 8/1956 | Evans |

(Continued)

FOREIGN PATENT DOCUMENTS

| CA | 2360230 A1 | 7/2000 |
| CN | 101467076 A | 6/2009 |

(Continued)

OTHER PUBLICATIONS

Corrected Notice of Allowability for U.S. Appl. No. 16/718,448 dated Jun. 2, 2022.
(Continued)

*Primary Examiner* — Tuyen Tra
(74) *Attorney, Agent, or Firm* — Dorsey & Whitney LLP

(57) ABSTRACT

Apparatus and methods are described including a corrective optical element having a thickness and/or a curvature that is different in different regions of the corrective optical element, such that the corrective optical element is configured, upon being adhered to any one of a plurality of differently-shaped optically-corrective single-vision lenses, to change a focal length of the optically-corrective single-vision lens differently in different regions of the optically-corrective single-vision lens. The corrective optical element is shapeable such that the corrective optical element can conform with a shape of any one of the plurality of differently-shaped optically-corrective single-vision lenses. Other applications are also described.

14 Claims, 11 Drawing Sheets

Related U.S. Application Data continuation of application No. 15/310,356, filed as application No. PCT/IL2015/050475 on May 7, 2015, now Pat. No. 9,995,948.

(60) Provisional application No. 61/991,514, filed on May 11, 2014.

(51) Int. Cl.
| | |
|---|---|
| G02B 3/10 | (2006.01) |
| G02B 7/02 | (2021.01) |
| G02B 1/14 | (2015.01) |
| G02C 7/02 | (2006.01) |
| G02C 7/10 | (2006.01) |
| G02C 9/00 | (2006.01) |

(52) U.S. Cl.
CPC ............ *G02C 7/021* (2013.01); *G02C 7/061* (2013.01); *G02C 7/10* (2013.01); *G02C 9/00* (2013.01); *G02C 2202/16* (2013.01)

(58) Field of Classification Search
USPC .................... 351/41, 159.01, 159.41, 159.42
See application file for complete search history.

(56) References Cited

U.S. PATENT DOCUMENTS

| | | | |
|---|---|---|---|
| 3,628,854 | A | 12/1971 | Jampolsky |
| 3,877,798 | A | 4/1975 | Tolar et al. |
| 3,904,281 | A | 9/1975 | Jampolsky |
| 4,547,049 | A | 10/1985 | Cotie |
| 4,650,275 | A | 3/1987 | Jones |
| 4,781,452 | A | 11/1988 | Ace |
| 4,867,553 | A | 9/1989 | Frieder |
| 4,883,548 | A | 11/1989 | Onoki |
| 4,921,626 | A | 5/1990 | Rhodenbaugh |
| 4,923,758 | A | 5/1990 | Marks et al. |
| 5,420,651 | A | 5/1995 | Kamppeter |
| 5,478,824 | A | 12/1995 | Burns et al. |
| 5,617,153 | A | 4/1997 | Allen et al. |
| 5,677,751 | A | 10/1997 | Gerber |
| 5,748,279 | A | 5/1998 | Glanzbergh |
| 5,764,333 | A | 6/1998 | Somsel |
| 5,926,250 | A | 7/1999 | Mukaiyama et al. |
| 6,019,470 | A | 2/2000 | Mukaiyama et al. |
| 6,139,148 | A | 10/2000 | Menezes |
| 6,170,952 | B1 | 1/2001 | La et al. |
| 6,290,354 | B1 | 9/2001 | Safran |
| 6,807,824 | B1 | 10/2004 | Miwa |
| 7,036,929 | B1 | 5/2006 | Harvey |
| 7,250,197 | B2 | 7/2007 | Rastogi et al. |
| 7,934,831 | B2 | 5/2011 | Spivey et al. |
| 8,042,941 | B2 | 10/2011 | Alonso et al. |
| 8,202,392 | B2 | 6/2012 | Jiang et al. |
| 8,702,230 | B2 | 4/2014 | Yi et al. |
| 8,714,739 | B2 | 5/2014 | Rouault De Coligny |
| 9,733,489 | B2 | 8/2017 | Paille et al. |
| 9,915,830 | B2 | 3/2018 | Curley et al. |
| 9,995,948 | B2 | 6/2018 | Arieli et al. |
| 10,126,571 | B2 | 11/2018 | Junkins |
| 10,437,309 | B2 | 10/2019 | Milford |
| 2003/0017340 | A1 | 1/2003 | Jiang et al. |
| 2003/0048405 | A1 | 3/2003 | Rivera |
| 2004/0055994 | A1 | 3/2004 | Miwa |
| 2004/0126587 | A1 | 7/2004 | Maki et al. |
| 2009/0004478 | A1 | 1/2009 | Baetzold et al. |
| 2010/0007846 | A1 | 1/2010 | Fermigier et al. |
| 2010/0007847 | A1 | 1/2010 | Cano et al. |
| 2010/0193112 | A1 | 8/2010 | Bovet et al. |
| 2010/0239776 | A1 | 9/2010 | Yajima et al. |
| 2010/0259717 | A1 | 10/2010 | Fermigier et al. |
| 2011/0181828 | A1 | 7/2011 | Yi et al. |
| 2013/0154906 | A1 | 6/2013 | Braun et al. |
| 2016/0161761 | A1 | 6/2016 | Quere et al. |
| 2016/0178934 | A1 | 6/2016 | Curley et al. |
| 2016/0311184 | A1 | 10/2016 | Gourraud |
| 2017/0059885 | A1 | 3/2017 | Patel |
| 2017/0235130 | A1 | 8/2017 | Baker |
| 2017/0269379 | A1 | 9/2017 | Arieli et al. |
| 2017/0299886 | A1 | 10/2017 | Carmon et al. |
| 2018/0077992 | A1 | 3/2018 | Kataoka et al. |
| 2018/0259794 | A1 | 9/2018 | Arieli et al. |

FOREIGN PATENT DOCUMENTS

| | | |
|---|---|---|
| EP | 1870738 A2 | 12/2007 |
| GB | 1100148 A | 1/1968 |
| JP | S4870647 A | 9/1973 |
| JP | S5336252 B1 | 10/1978 |
| JP | 01026818 A | 1/1989 |
| JP | S6426818 U | 2/1989 |
| JP | 04120927 U | 10/1992 |
| JP | H058534 U | 2/1993 |
| JP | 2007102057 A | 4/2007 |
| JP | 2010033070 A | 2/2010 |
| JP | 2010508552 A | 3/2010 |
| WO | 2003023495 A2 | 3/2003 |
| WO | 2009103359 A1 | 8/2009 |
| WO | 2013169987 A1 | 11/2013 |
| WO | 2015124574 A1 | 8/2015 |
| WO | 2015173797 A1 | 11/2015 |
| WO | 2017042612 A1 | 3/2017 |
| WO | 2019219627 A1 | 11/2019 |
| WO | 2021059128 A1 | 4/2021 |
| WO | 2021161125 A1 | 8/2021 |
| WO | 2021198822 A1 | 10/2021 |

OTHER PUBLICATIONS

Issue Notification for U.S. Appl. No. 16/718,448 dated Jun. 15, 2022.
Non-Final Office Action for U.S. Appl. No. 16/718,448 dated Dec. 17, 2021.
Notice of Allowance for U.S. Appl. No. 16/718,448 dated Mar. 30, 2022.
Office Action for Brazilian Application No. 11 2016 026162 3 dated Feb. 28, 2022.
U.S. Appl. No. 16/718,448, filed Dec. 18, 2019.
U.S. Appl. No. 17/763,351, filed Mar. 24, 2022.
Written Opinion from International Application No. PCT/IB2021/052164 dated Feb. 9, 2022.
Decision of Dismissal of Amendment for Japanese Application No. 2017-51246 dated Aug. 31, 2020.
Decision of Rejection for Chinese Application No. 201580029313.2 dated Mar. 11, 2020.
Decision of Rejection for Japanese Application No. 2017-51246 dated Aug. 20, 2020.
Decision to Refuse for European Application No. 15793232.8 dated Jan. 22, 2019.
Examination Report for Australian Application No. 201260773 dated Jun. 6, 2019.
Examination Report for European Application No. 15793232.8 dated Sep. 15, 2017.
Examination Report for Indian Application No. 201627037817 dated Oct. 31, 2020.
Extended European Search Report for European Application No. 15793232.8 dated May 24, 2017.
International Search Report and Written Opinion from International Application No. PCT/IB2020/058844 dated Dec. 7, 2020.
Minutes of Oral Proceedings for European Application No. 15793232.8 dated Nov. 27, 2018.
Notice of Acceptance for Australian Application No. 2015260773 dated Nov. 13, 2019.
Office Action for Chinese Application No. 201580029313.2 dated May 22, 2019.
Office Action for Chinese Application No. 201580029313.2 dated Oct. 3, 2019.

(56) References Cited

OTHER PUBLICATIONS

Office Action for Chinese Application No. 201580029313.2 dated Sep. 3, 2018.
Office Action for Japanese Application No. 2017512464 dated Feb. 27, 2019.
Office Action for Japanese Application No. 2017-512464 dated Nov. 25, 2019.
Result of Telephone Consultation for European Application No. 15793232.8 dated Nov. 5, 2018.
Summons to Attend Oral Hearing for European Application No. 15793232.8 dated Apr. 10, 2018.
Examination Report for Australian Application No. 2020201126 dated Feb. 11, 2021.
International Search Report and Written Opinion from International Application No. PCT/IB2021/052164 dated Sep. 22, 2021.
Invitation to Pay Additional Fees for International Application No. PCT/IB2021/052164 dated Jun. 28, 2021.
International Search Report and Written Opinion from International Application No. PCT/IL2015/050475 dated Sep. 16, 2015.
Issue Notification for U.S. Appl. No. 15/310,356 dated May 23, 2018.
Non-Final Office Action for U.S. Appl. No. 15/976,669 dated Sep. 9, 2019.
Notice of Allowance for U.S. Appl. No. 15/976,669 dated Jun. 4, 2020.
Notice of Allowance for U.S. Appl. No. 15/310,356 dated Apr. 16, 2018.
Notice of Allowance for U.S. Appl. No. 15/310,356 dated Jan. 26, 2018.
Notice of Allowance for U.S. Appl. No. 15/976,669 dated Jan. 10, 2020.
U.S. Appl. No. 15/310,356, filed Nov. 10, 2016.
U.S. Appl. No. 15/976,669, filed May 10, 2018.
U.S. Appl. No. 61/991,514, filed May 11, 2014.
U.S. Appl. No. 62/906,157, filed Sep. 26, 2019.
Chou, et al., "Effect of Multiple Antireflection Coatings on Impact Resistance of Hoya Phoenix Spectacle Lenses", Optom Exp Clin, 2006, pp. 86-89.
Meslin, "Opthalmic Optics: Materials and Treatments", Europe Essilor Academy, 2010, 68.
International Search Report and Written Opinion from International Application No. PCT/IB2021/050759 dated Jul. 16, 2021.
Invitation to pay Additional Fees for International Application No. PCT/IB2021/050759 dated Apr. 30, 2021.
Notice of Re-examination of Chinese Application No. 201580029313.2 dated Jul. 29, 2021.
Summons to Attend Oral Hearing for European Application No. 15793232.8 dated May 27, 2021.
U.S. Appl. No. 17/904,036, filed Aug. 11, 2022.
U.S. Appl. No. 17/904,269, filed Aug. 15, 2022.
U.S. Appl. No. 18/051,140, filed Oct. 31, 2022.
U.S. Appl. No. 62/977,313, filed Feb. 16, 2020.
U.S. Appl. No. 63/002,388, filed Mar. 31, 2020.
U.S. Appl. No. 63/002,393, filed Mar. 31, 2020.

OPTICAL ELEMENT FOR CONVERTING A SINGLE-VISION LENS TO A PROGRESSIVE LENS

CROSS-REFERENCE TO RELATED APPLICATIONS

The present application is a continuation of U.S. Ser. No. 15/976,669 to Arieli (published as US 2018/0259794), filed May 10, 2018, which is a continuation of U.S. Ser. No. 15/310,356 to Arieli (issued as U.S. Pat. No. 9,995,948), filed Nov. 10, 2016, which is a US national phase application of PCT Application No. PCT/IL/2015/050475 to Arieli (published as WO 15/173797), filed May 7, 2015, which claims priority from U.S. Provisional Patent Application 61/991,514 to Arieli, filed May 11, 2014.

TECHNICAL FIELD

The present invention relates to multifocal ophthalmic lenses, progressive lenses, lens designs, eyeglasses. More specifically, the present invention relates to converting single vision lenses to multifocal or progressive lenses.

BACKGROUND ART

Presbyopia is usually treated with multifocal eyeglasses, progressive eyeglasses or contact lenses. Many methods for creating and manufacturing of progressive lenses are known in the art, such as polishing a semi-finished lens or molding. LASIK and other types of surgery cannot prevent or remedy this natural occurrence, which gradually affects nearly everyone over age 40. The visual effects caused by Presbyopia may slowly worsen for several years, requiring new changes in lens prescription, but will stabilize by age 65 or 70.

Corrective lenses are used in eyeglasses to correct Presbyopia and other disorders of accommodation. A basic solution for Presbyopia is the use of multifocal spectacle lenses. Multifocal spectacle lenses contain two or more lens powers to help you see objects at all distances. Bifocals contain two lens powers; trifocals contain three.

Progressive spectacle lenses are characterized by a gradient of increasing lens power, added to the wearer's correction for the other refractive errors. The gradient starts at the wearer's distance prescription, at the top of the lens and reaches a maximum addition power, or the full reading addition, at the bottom of the lens. The addition in middle of the lens usually enables reading text on a computer screen. The length of the progressive power gradient on the lens surface depends on the design of the lens, with a final addition power between 0.75 and 3.50 diopters. The addition value prescribed depends on the level of presbyopia of the patient.

The main disadvantages of multifocal eyeglasses and progressive lenses are their high cost and their need for professional adaptation.

There is thus required a method and system that provides a reasonable solution for the Presbyopia problem, while keeping a very low price that enables use of progressive lenses by everyone who needs it. Such a solution usually will not require a professional adaptation.

DESCRIPTION OF THE PRIOR ART

There are many means of converting conventional eyeglasses.

U.S. Pat. No. 2,511,329 describes a cover for a spectacle lens including, a thin flat sheet of tinted transparent material substantially the size and shape of a lens, and an adhesive on one side of the sheet, the sheet being weakened along a line establishing an area that can be removed at will.

U.S. Pat. No. 2,759,394 describes a glare shield for a concave-convex lens, said shield comprising a thin, preformed, substantially non-stretchable self-supporting sheet of tinted transparent material having uniform thickness and of no greater overall plan dimensions than said lens, said sheet comprising a narrow peripheral border portion preformed into a predetermined concave shape to conform to the convex surface of said lens, the remaining central major portion of said sheet within the inner periphery of said border portion being curvably pre-formed to a concave curvature greater than the convex curvature of said convex lens surface, whereby said central major portion is out of contact with said convex lens surface when said border portion is in conforming contact with said convex lens surface within the periphery of said lens surface, a layer of pressure-sensitive adhesive on only the lens-engaging face of said border portion to removably adhere said sheet to said lens, and an upset portion of said border portion restricted in extent to lie within the peripheral boundaries of said sheet and pre-formed to stand upwardly out of the curved path established by the border portion sufficiently to accept a fingernail thereunder between said upset portion and said lens surface for the purpose of removing said sheet from lens, said upset portion providing by expansion latitude the exact curvature of said border portion to fit lenses of slightly differing convex outer surface curvatures.

U.S. Pat. No. 3,628,854 describes a thin, fully conformable, plastic membrane which can be applied, and made to adhere with finger pressure, to spectacle lenses for quickly and impermanent changing one or more optical characteristics of the spectacle lenses. The membrane may be embossed on one of its surfaces to form a Fresnel-type lens or prism structure to introduce a deviation of the light ray, may be partially or entirely tinted to pass only certain wavelengths of light, may be diffused, or blurred uniformly or differentially, may have selective opaqued or transmitting areas or a combination thereof.

U.S. Pat. No. 5,764,333 describes a method and kit for making sunshields for eyeglasses. The sunshields are flexible, transparent sheets of smooth plastic film that are retained on lenses of eyeglasses by electrostatic attraction. The sunshields are made of smooth plastic film having opposed parallel surfaces that are flat and planar except as the film may be curved to match surfaces of the lenses, and absorb some incident electromagnetic radiation. The method includes the steps of laying eyeglasses on a sheet of writing material and tracing an outline of lenses of the eyeglasses on the sheet with a writing implement, cutting along the outlines on the sheet to obtain silhouettes of the lenses, comparing the silhouettes to the lenses in the eyeglasses to see if they match, and laying the silhouettes on a sheet of the smooth plastic film, and cutting the plastic film along the edges of the silhouettes. Also included in the invention is a carrying case for the sunshields, having a material on its interior surface which can impart an electrostatic charge to the sunshields.

In U.S. Pat. No. 6,290,354, non-corrective eyewear such as sunglasses, skiing goggles and diving masks can be easily and economically made to correct eyesight with a corrective eyewear attachment that is aesthetically pleasing. The attachment may include a corrective nose piece connector and/or a rotatable lens. The rotatable lens makes it more economical to have prefabricated corrective lenses that requires a particular lens orientation such as when the corrective lens corrects for an astigmatism.

In U.S. Pat. No. 7,036,929, an apparatus and method for applying and removing a disposable optical film to and from an eyeglass lens is described. The disposable optical film of the invention has an adhesive element on one side for the removable attachment to an eyeglass lens. The adhesive element is protected by a peel and stick backing that has indicia defining the parameters of the corrective film, thus allowing the user to trim the corrective film to the appropriate size and shape of a multiplicity of eyeglass styles without compromising the integrity of the corrective film.

None of the abovementioned provides a reasonable low cost solution for the Presbyopia problem.

SUMMARY OF THE INVENTION

It is therefore an object of the present invention to provide a method and system that provides a reasonable low cost solution for vision problems by applying an optical corrector sticker to a regular low cost lens.

According to one embodiment of the present invention a progressive lens, made of a clear elastic material and implemented as a sticker is applied on regular single-vision spectacles. Applying the sticker may be done either during lens production process, by a sales representative or by the customer itself.

According to another embodiment of the present invention an optical corrector, made of a clear elastic material and implemented as a sticker is applied on regular single-vision spectacles to correct optical vision impairments such as Astigmatism.

In order to understand the invention and to see how it may be carried out in practice, embodiments will now be described, by way of non-limiting example only, with reference to the accompanying drawing, in which:

DETAILED DESCRIPTION OF INVENTION

The following discussion describes in detail embodiments of the present invention. This should not be construed, however, as limiting the invention to those particular embodiments since practitioners skilled in the art will recognize numerous other embodiments as well.

Figure 1:
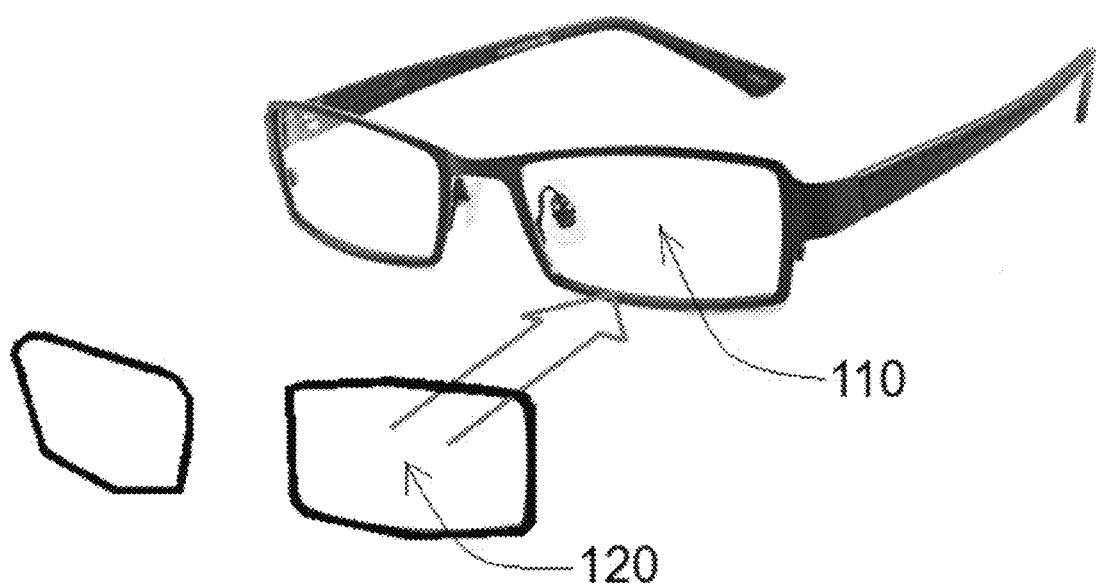
FIG. 1 illustrates a regular single-vision lens to which a corrective optical film is to be applied to convert it to a progressive or a multifocal lens.

FIG. 1 shows a regular single-vision lens 100 to which a corrective optical film 120 is to be applied to convert the regular single-vision lens to a progressive or a multifocal lens. The corrective film 120 made of a clear elastic material and implemented as a sticker, is applied by using transparent adhesive material on said regular single-vision lens 100. The corrective optical film 120 may be attached to the front surface or the rear surface of the regular single-vision lens 100. Two or more different corrective optical films may also be attached to the front surface and the rear surface of the regular single-vision lens 100. The single-vision lens 100 may be implemented as a transparent material without any optical corrective value.

Figure 2A:
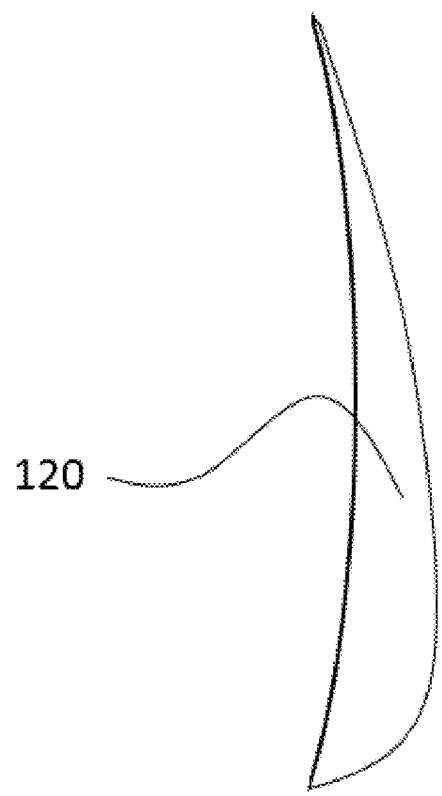
FIG. 2a illustrates a typical cross section of one embodiment of a corrective optical film according to the present invention.
Figure 2B:
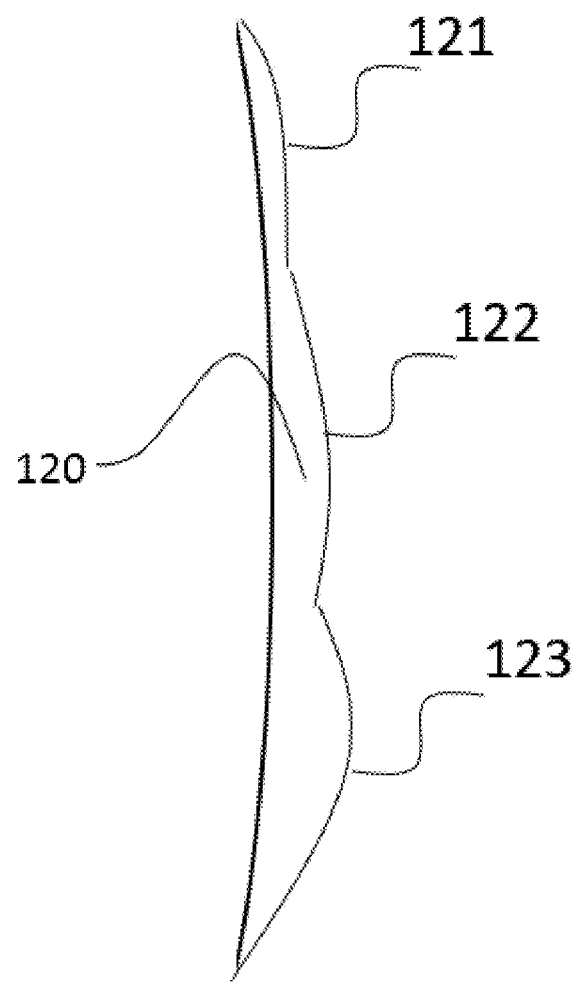
FIG. 2b illustrates a typical cross section of another embodiment of a corrective optical film according to the present invention.

FIG. 2a and FIG. 2b show a typical cross section of the corrective optical film 120 according to two embodiments of the present invention. The optical film 120 may have different optical powers in different regions to correct the focal length of a regular single-vision lenses differently. In one embodiment (FIG. 2a) the film 120 may have a free form. In another embodiment (FIG. 2b) the film 120 may have discrete regions 121, 122 and 123 of different thicknesses and different curvatures in different places. Alternatively or in addition, the film may have a graded index profile which means different refractive indices in different regions with a uniform or non-uniforms thicknesses and curvature in order to have different optical powers to change the focal lengths of the said regular single-vision lenses differently in different regions. The graded index profile may be produced according to any known method known in the industry, such as Partial polymerization by UV light, Neutron irradiation or Chemical vapor deposition. The corrective optical film 120 may be disposable or have a life time-limit, and may include other elements such as anti-glare and/or anti-scratch coating, and/or UV protective materials, and/or other additional optical functionalities as currently known in the art.

Figure 3:
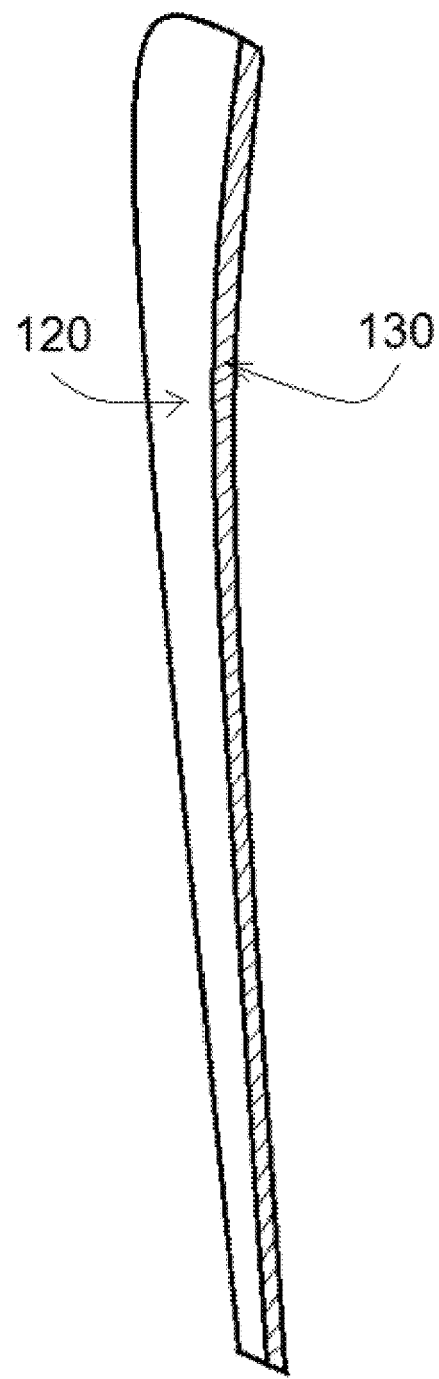
FIG. 3 illustrates a corrective optical film of the present invention including a transparent adhesive backing.

FIG. 3 shows the corrective optical film 120 of the present invention including a transparent adhesive backing 130 to adhere the film to the lens to be converted to a progressive or multifocal lens. The adhesive backing may be a permanent or a peel-off adhesive backing, a self-sticking backing with a spray-on mist or any other suitable backing with a spray-on mist or any other suitable means to effectively adhere the film to the said lens. Furthermore, in order that the adhesive side doesn't prematurely stick on the sunglasses, a spray of water can be applied in order to position the film before it is in place.

Figure 4A:
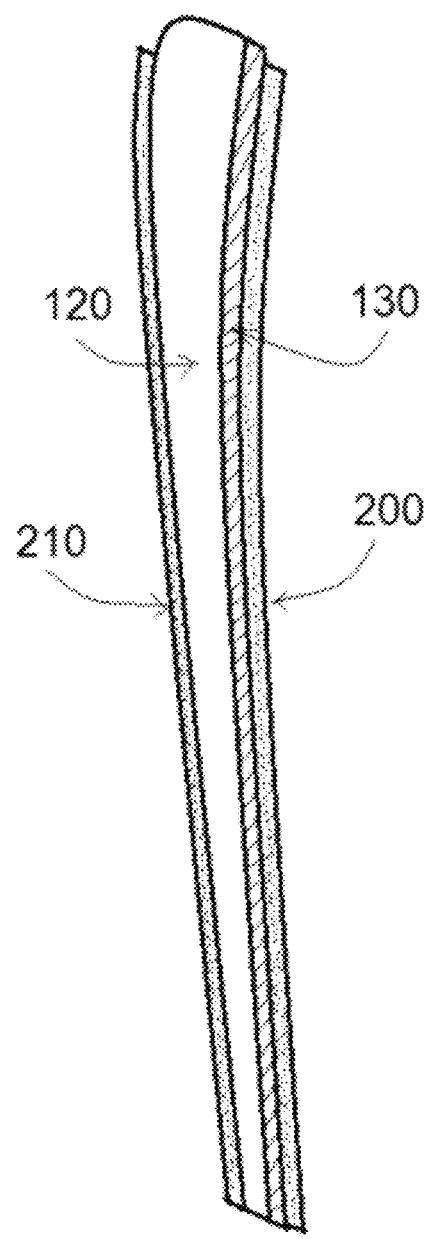
FIG. 4a illustrates a corrective optical film being protected with two films, one on each side.
Figure 4B:
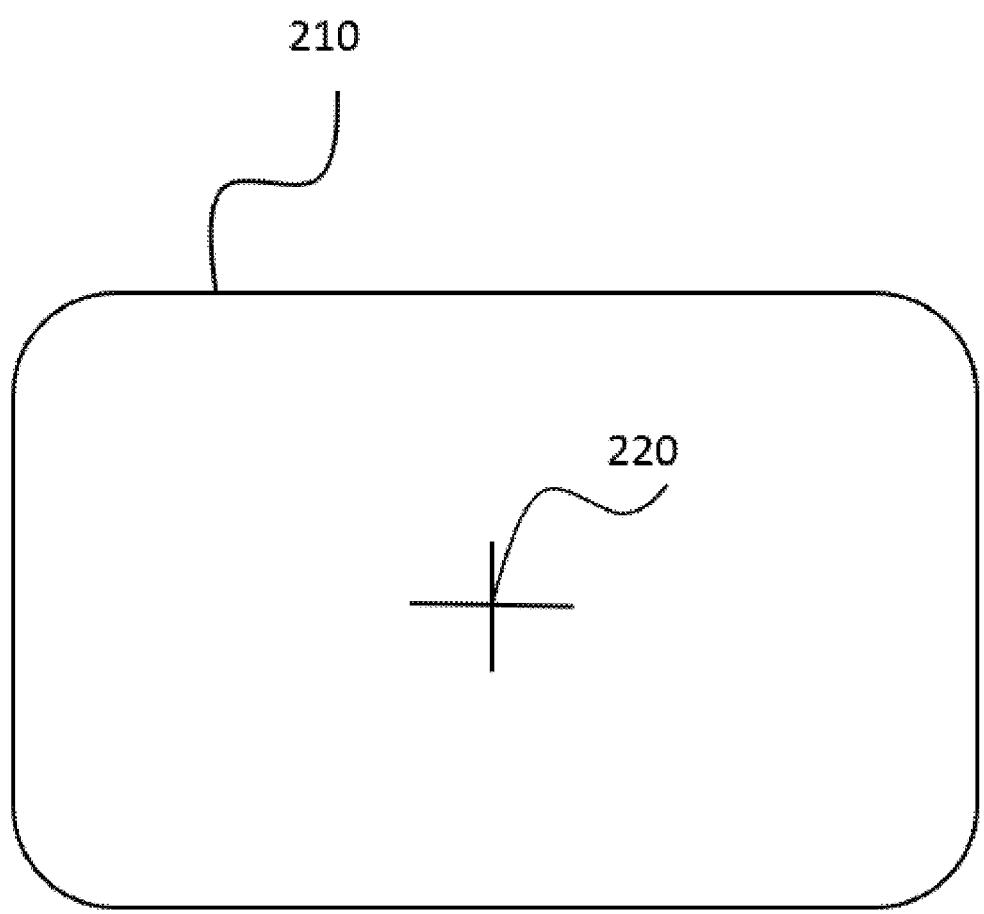
FIG. 4b illustrates simple alignment mark on one of the protection films.

FIG. 4a and FIG. 4b describe the corrective optical film 120 of the present invention when being protected with two films 200 and 210, one on each side. Protection film 200 protects the adhesive substance 130 and is removed just before applying the corrective optical film 120 to the said single-vision lens. Protection film 210 protects the outer side of the corrective optical film 120 and is usually removed after applying the corrective optical film 120 to the said single-vision lens in a similar process which is commonly used to apply anti-scratch screen protector for a cellular phone. On the protection film 210 there may be alignment mark 220 that its purpose is to accommodate the corrective optical film 120 to the right location on the lens to be corrected. Other marks may indicate areas which should not be cut, to prevent damage to the optical areas of the corrective optical film 120. In case protective film is not used, such erasable marks will appear directly on the corrective optical film 120 itself and will be erased after applying the corrective optical film 120 to the eyeglasses lens 100.

Figure 5A:
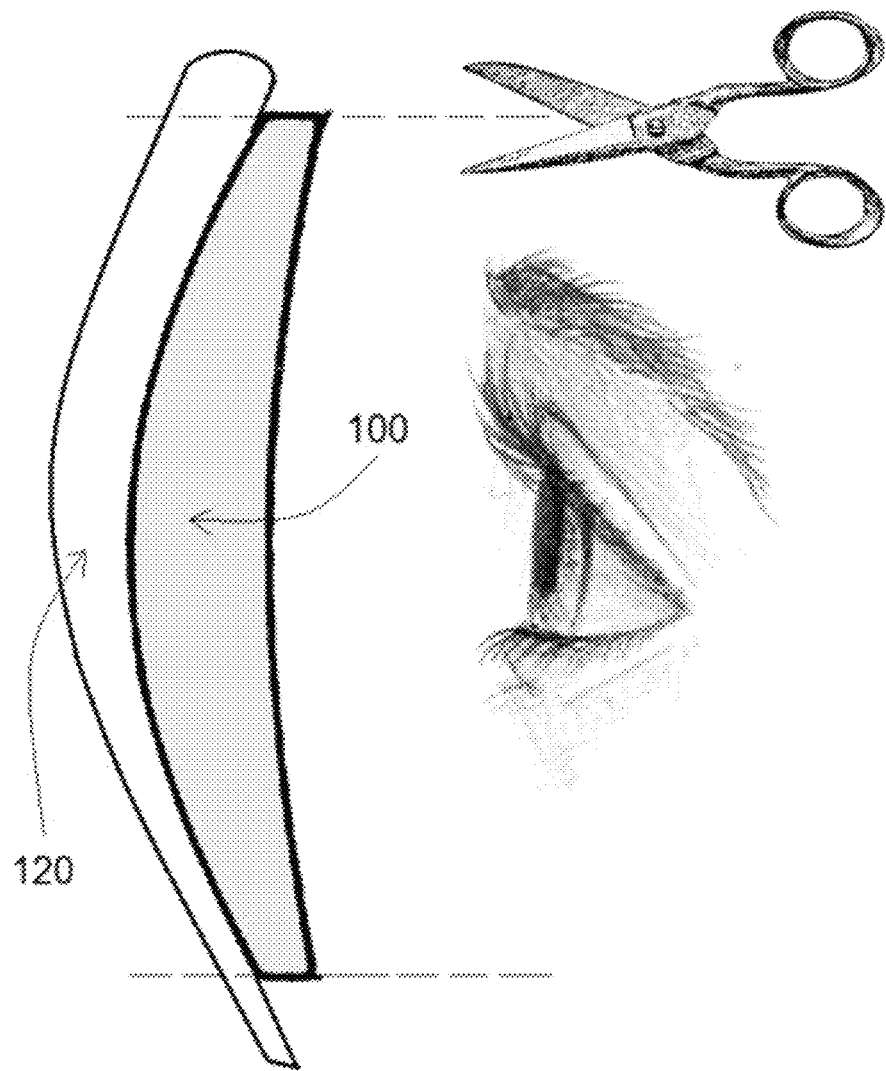
FIG. 5a illustrates a cross section of the corrective optical film attached to the outer surface of a regular single-vision lens.
Figure 5B:
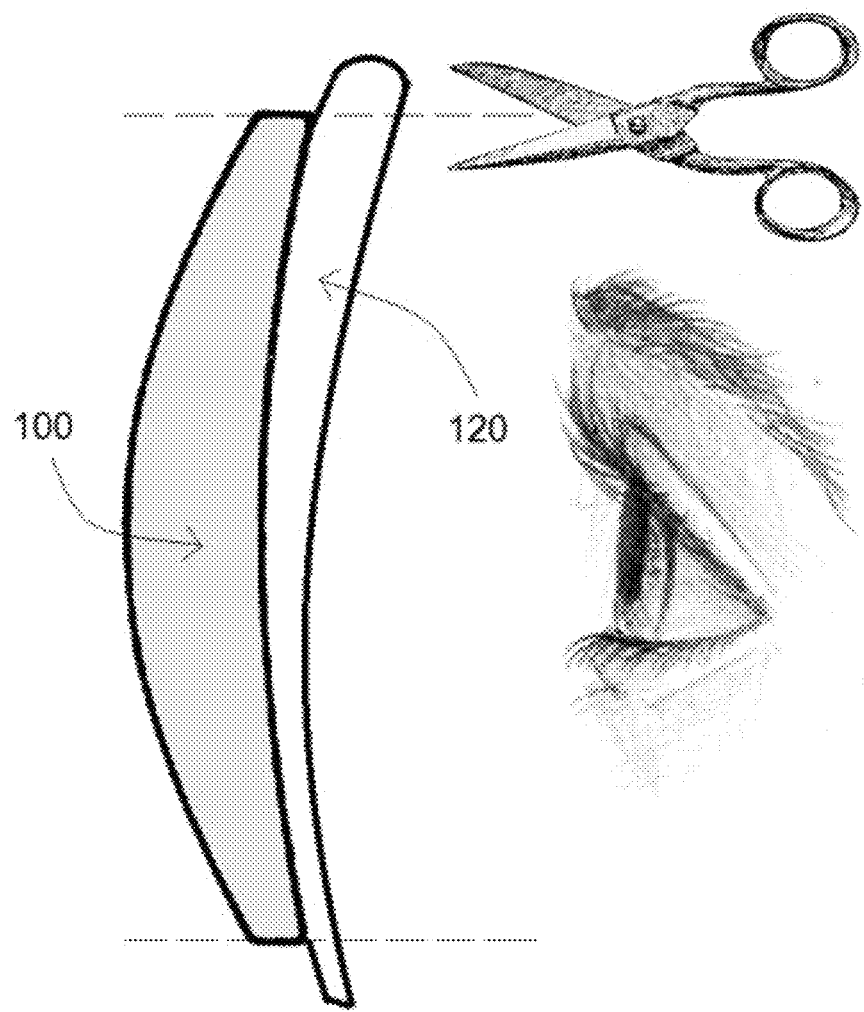
FIG. 5b illustrates a cross section of the corrective optical film attached to the inner surface of a regular single-vision lens.

FIG. 5a and FIG. 5b show a cross section of the corrective optical film 120 attached to the regular single-vision lens 100 to be converted to a progressive or a multifocal lens. In one embodiment according to the present invention (FIG. 5a) the corrective optical film 120 is attached to the outer side of the regular single-vision lens 100 (far from the patient's eye). In another embodiment according to the present invention (FIG. 5b) the corrective optical film 120 is attached to the inner side of the regular single-vision lens 100 (between the patient's eye and the lens). The single-vision lens 100 must be at a minimal size to enable different optical regions in a multifocal lens, and the film 120 will usually be larger than the single-vision lens 100. In such case, the film 120 is cut to accommodate the size and shape of the lens on which it is to be installed. The film 120 may be cut before or after applying it to the lens. In another embodiment of the present invention, the film 120 may come in pre-defined sizes adapted for specific common models and styles of eyeglasses, and therefore the need to cut it will be eliminated.

Figure 6A:
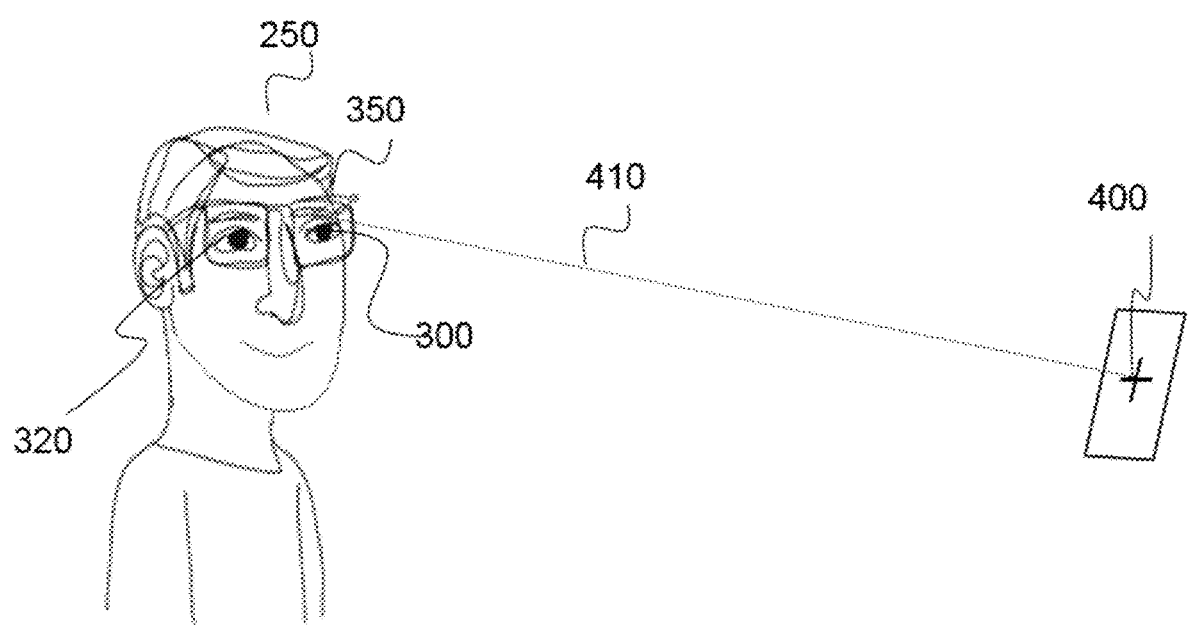
FIG. 6a illustrates measuring of the largest distance to a target where the vision is still clear without blurring.
Figure 6B:
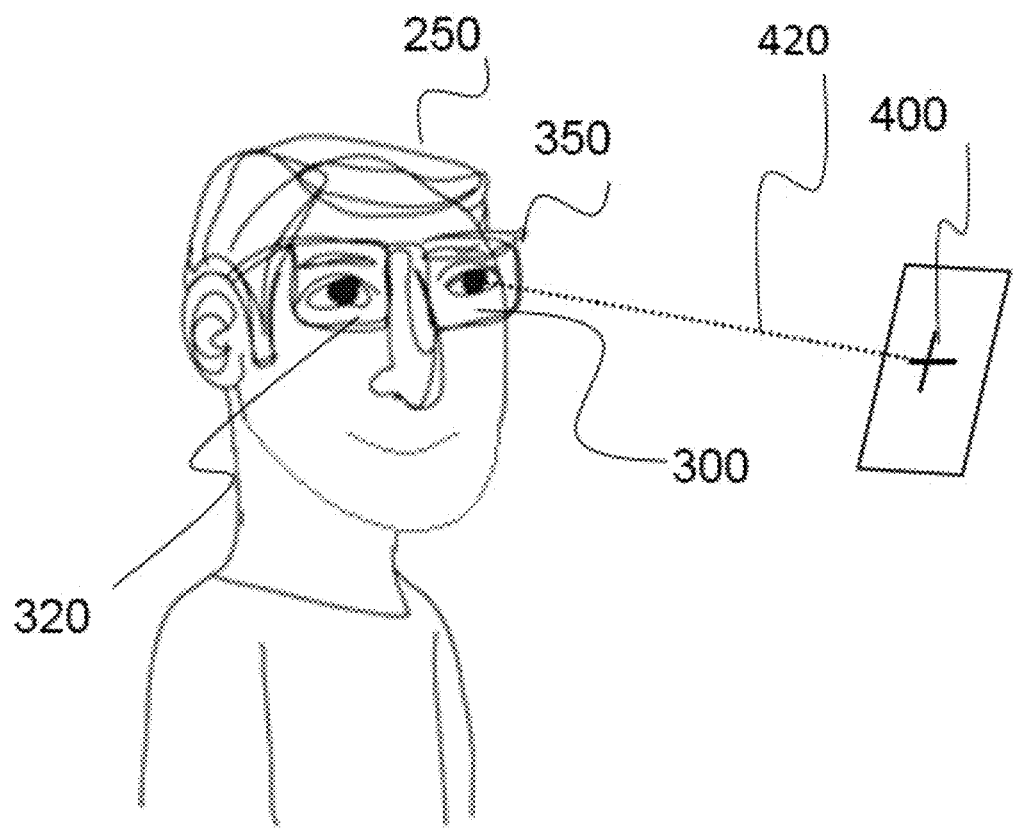
FIG. 6b illustrates measuring of the shortest distance to a target where the vision is still clear without blurring.

FIGS. 6a and 6b show a method for accommodating the proper corrective optical films to two single-vision lenses 300 and 320 of eyeglasses 350 in order to convert said two single-vision lenses to progressive or multifocal lenses. The customer 250 who wears said eyeglasses 350 with single-vision lenses has to do two examinations. One examination is to measure the largest distance 410 to the target 400 that he still has clear vision without blurring (FIG. 6a). The second examination is to measure the smallest distance 420 to the target 400 that he still has clear vision without blurring (FIG. 6b). These two examinations have to be done for each eye while wearing the eyeglasses. From these two sets of distances 410 and 420 the proper corrective optical films for each eye are chosen.

Figure 7:
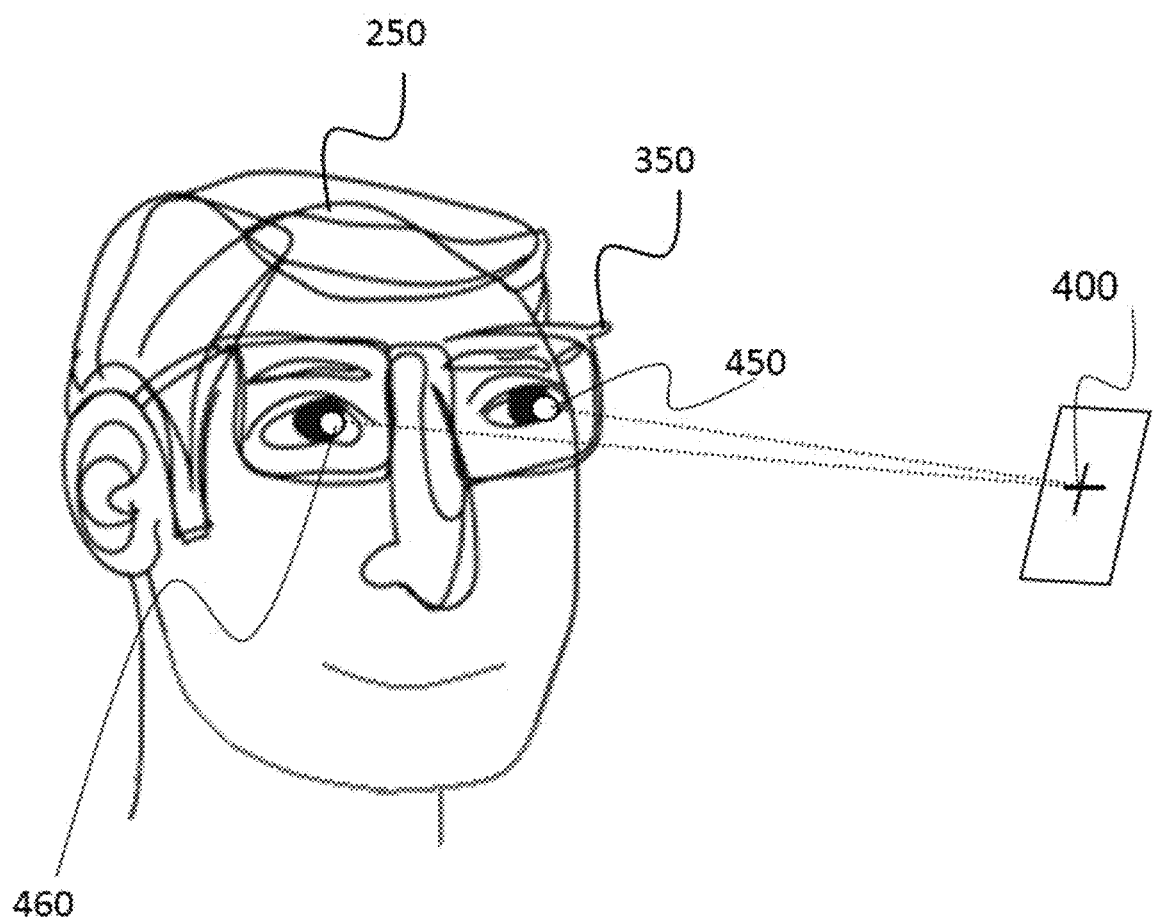
FIG. 7 illustrates marking points where the pupils of each eye are located.

FIG. 7 shows a method for matching the corrective optical films to the proper location on each of the single-vision lenses to be converted to progressive or multifocal lenses. The customer 250 who wears said eyeglasses 350 with said single-vision lenses to be converted, has to look with both eyes to a single point target 400 located at known distance. The customer itself or a sales representative should mark with an erasable marker on each lens of the eyeglasses a point 450 and 460 where each pupil of each eye is located. When the corrective film is applied to each lens to be converted, this mark is matched to the alignment mark 220 on the protection film 210 (FIG. 4a and FIG. 4b). When the corrective film is applied to the rear surface of the lens the point 450 is marked on the front surface of the lens and vice versa. After completing the alignment, all marks required for the alignment may be erased. When using protective film 210 on the outer side of the corrective optical film, the removal of this protective film will also remove the alignment marks and leave the corrective film clear of any marks.

The invention claimed is:

1. Apparatus for use with a plurality of differently-shaped optically-corrective single-vision lenses, the apparatus comprising:
   a corrective optical element having a thickness and/or a curvature that is different in different regions of the corrective optical element, such that the corrective optical element is configured, upon being adhered to any one of the plurality of differently-shaped optically-corrective single-vision lenses, to change a focal length of the optically-corrective single-vision lens differently in different regions of the optically-corrective single-vision lens,
   the corrective optical element being shapeable such that the corrective optical element can conform with a shape of any one of the plurality of differently-shaped optically-corrective single-vision lenses.

2. The apparatus according to claim 1, wherein the corrective optical element is configured to convert the optically-corrective single-vision lens to which it is adhered, to a progressive lens.

3. The apparatus according to claim 1, wherein the corrective optical element is configured to be adhered to one of the optically-corrective single-vision lens, at least partially using vacuum.

4. The apparatus according to claim 1, further comprising a protective film configured to protect at least one side of the corrective optical element.

5. The apparatus according to claim 1, further comprising one or more markers configured to outline an area on the corrective optical element that should not be cut.

6. The apparatus according to claim 1, wherein the corrective optical element comprises at least one coating selected from the group consisting of: an anti-glare coating layer, and an anti-scratch coating.

7. The apparatus according to claim 1, wherein the corrective optical element is larger than at least some of the optically-corrective single-vision lenses.

8. The apparatus according to claim 1, further comprising one or more alignment markers configured to facilitate positioning of the corrective optical element on the optically-corrective single-vision lens.

9. The apparatus according to claim 8, further comprising a protective film configured to protect at least one side of the corrective optical element, wherein the one or more alignment markers are marked on the protective film.

10. A method comprising:
   identifying a progressive prescription for at least one lens of eyeglasses of a subject;
   generating a lens having the progressive prescription by:
      shaping a corrective optical element such as to conform with a shape of an optically-corrective single-vision lens; and
      adhering the corrective optical element to the optically-corrective single-vision lens, such as to change a focal length of the single-vision lens differently in different regions of the single-vision lens,
   wherein adhering the corrective optical element to the optically-corrective single-vision lens comprises adhering the corrective optical element to the optically-corrective single-vision lens at least partially using vacuum.

11. The method according to claim 10, wherein the corrective optical element is larger than the optically-corrective single-vision lens.

12. The method according to claim 10, further comprising cutting the corrective optical element to a size that fits the optically-corrective single-vision lens.

13. A method comprising:
   identifying a progressive prescription for at least one lens of eyeglasses of a subject;

generating a lens having the progressive prescription by:
shaping a corrective optical element such as to conform with a shape of an optically-corrective single-vision lens;
positioning the corrective optical element with respect to the optically-corrective single-vision lens using one or more alignment markers, and
subsequently, adhering the corrective optical element to the optically-corrective single-vision lens, such as to change a focal length of the single-vision lens differently in different regions of the single-vision lens.

14. A method comprising:
identifying a progressive prescription for at least one lens of eyeglasses of a subject;
generating a lens having the progressive prescription by:
shaping a corrective optical element such as to conform with a shape of an optically-corrective single-vision lens; and
adhering the corrective optical element to the optically-corrective single-vision lens, such as to change a focal length of the single-vision lens differently in different regions of the single-vision lens,
wherein the corrective optical element comprises at least one coating selected from the group consisting of: an anti-glare coating layer, and an anti-scratch coating.

* * * * *